J. A. WHITE.
CLOVER FEEDER.
APPLICATION FILED JAN. 23, 1908.
993,213.
Patented May 23, 1911.
2 SHEETS—SHEET 1.
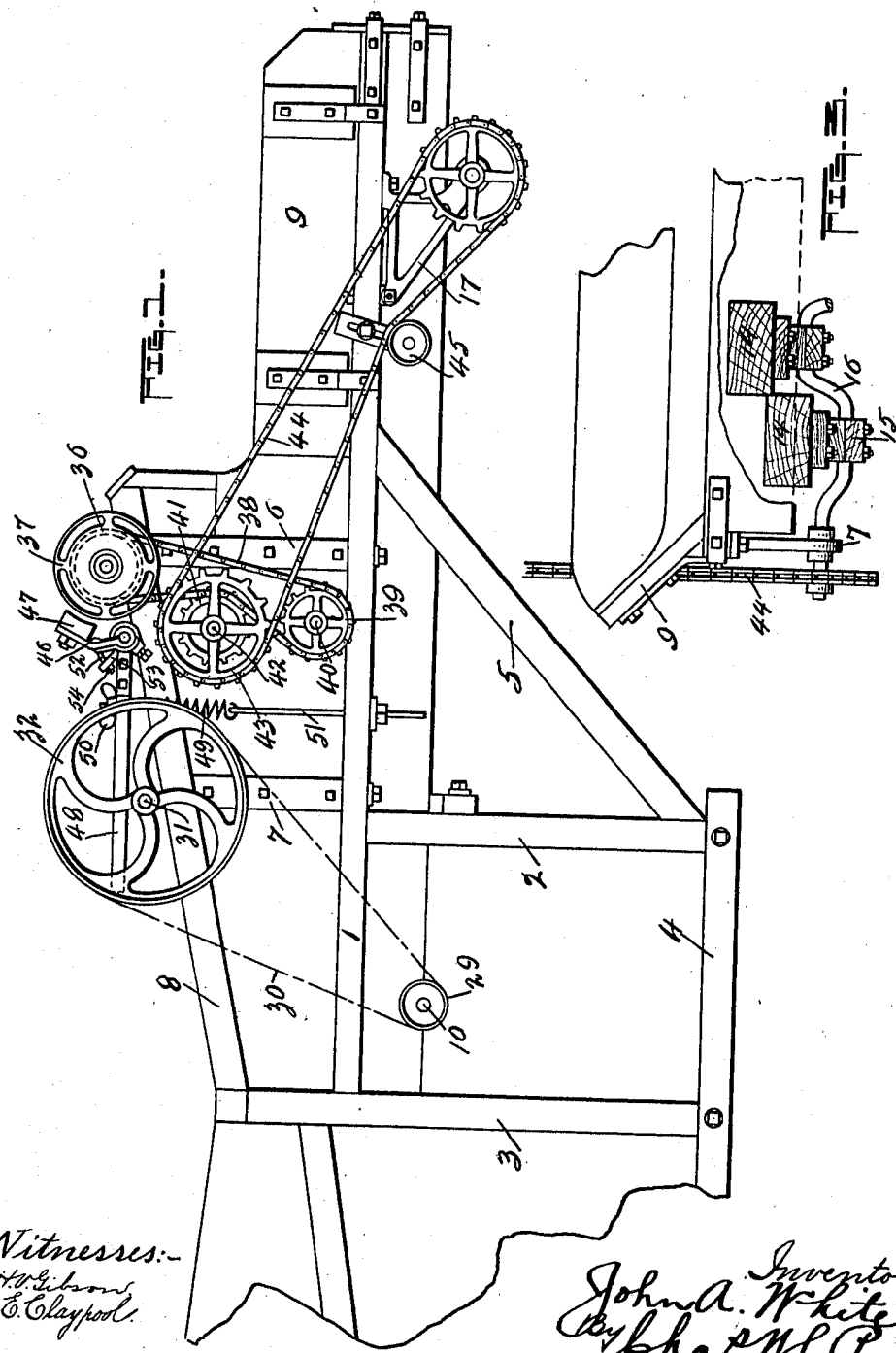

J. A. WHITE.
CLOVER FEEDER.
APPLICATION FILED JAN. 23, 1908.
993,213.
Patented May 23, 1911.
2 SHEETS—SHEET 2.
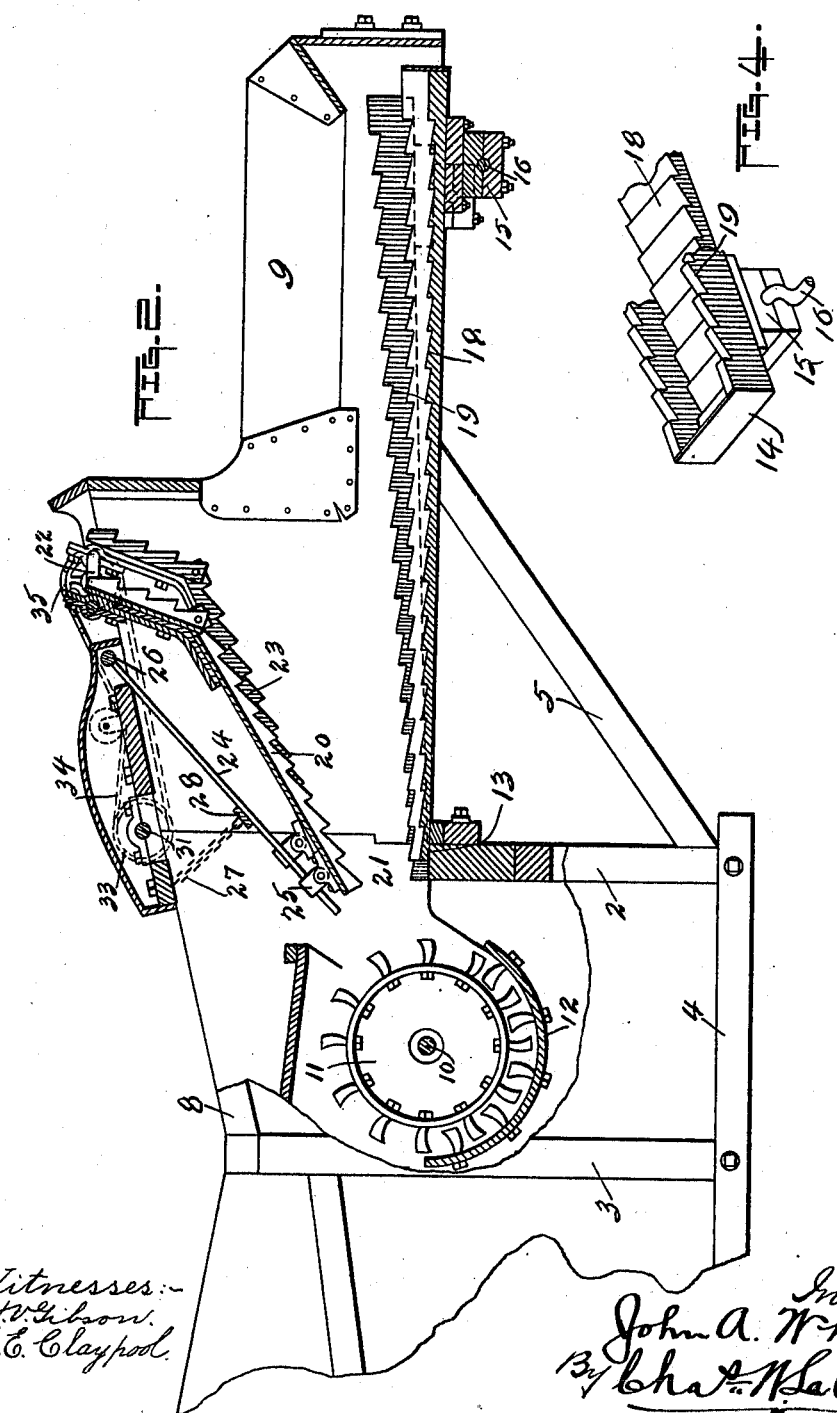

UNITED STATES PATENT OFFICE.

JOHN A. WHITE, OF WASHBURN, ILLINOIS.

CLOVER-FEEDER.

993,213.         Specification of Letters Patent.     Patented May 23, 1911.

Application filed January 23, 1908. Serial No. 412,293.

*To all whom it may concern:*

Be it known that I, JOHN A. WHITE, a citizen of the United States, residing at Washburn, in the county of Woodford and State of Illinois, have invented certain new and useful Improvements in Clover-Feeders; and I do hereby declare that the following is a full, clear, and exact description of the invention, which will enable others skilled in the art to which it appertains to make and use the same.

This invention has reference to a certain new and improved feeding attachment for threshers, and has special reference to a clover-feeder, applicable to a grain separator having a clover attachment or to regular clover threshers.

For a further and full description of the invention herein and the merits thereof and also to acquire a knowledge of the details of construction of the means for effecting the result, reference is had to the following description and drawings hereto attached.

While the essential and characteristic features of the invention are susceptible of modification, still the preferred embodiment of the invention is illustrated in the accompanying drawings, in which:—

Figure 1 is a side elevation of my improved clover feeder attachment, connected with the cylinder end of a thresher; Fig. 2 is a vertical longitudinal sectional view through the feeder; Fig. 3 is a partial end view of the feeder with a portion thereof broken away, and Fig. 4 is a detail perspective of one of the lower feeding pans or troughs.

Like numerals of reference indicate corresponding parts throughout the figures.

The attachment to which reference has been made, is designed as a clover feeder for feeding clover in clover threshers and grain separators using a clover attachment and in fact may be attached to certain types of grain threshers as a substitute for the ordinary and well known endless-belt type or bundle carrier feeder, and produce results such as have not heretofore been attainable with feeders of that class. Handling clover, unlike handling grain in bundles necessitating band-cutters and like mechanism, is handled in bulk and requires peculiar handling to be fed uniformly to the cylinder to insure breaking up and separating the seed in the pods and to have the feed so under control that slugging the cylinder is wholly obviated.

The feeder or the body proper thereof, comprises longitudinal sills 1 connected with the uprights 2 and 3 and the lower sill 4 and braced therefrom by the diagonally disposed brace 5. The upper inner supports of the body proper are composed of the uprights 6 and 7, the inclined top sills 8, while side, top and end boards or filling plates, either detachable or stationary complete the body, together with the flared side boards 9 at the open end of the feeder which accommodate the bulk of material to be thrown into the feeder onto the outer receiving ends of feeding troughs or pans to be described.

10 designates the cylinder shaft, driven in a suitable manner on which is mounted a cylinder 11 of any well known or preferred construction partially surrounded by a concave 12, which may also be of any well known or preferred construction. Extending from a point removed but a short distance from the cylinder and having their inner ends free and reciprocally supported on a sill 13 are a plurality of feeding troughs or pans 14 which are placed side by side in close relation to each other, so as to leave as little intervening space as possible between the same, and the outer ends of said troughs or pans are connected through suitable boxings 15 with a crank shaft 16 journaled at its outer ends in boxings or brackets 17 suspended from the sills 1. The crank portions of the shaft 16 with which the outer ends of the troughs or pans 14 are connected are set at opposite angles, alternately, so that as the crank shaft is revolved, the troughs or pans are caused to be moved up and down and back and forth, which movement will distribute the clover equally, and also causes it to move along over the troughs or pans to the cylinder.

I prefer to dispose the troughs or pans 14 more in a horizontal position with their inner ends more in line with the axis of the cylinder shaft 10, and with the bottoms having their upper faces serrated or notched as at 18 and the upper edges of the sides of said troughs, also serrated or notched as at 19; the sides being preferably inclined from their outer ends to the cylinder as shown. With such a construction of the bottoms and sides of the feed troughs or pans, the clover thrown onto the same in the open end of the feeder is materially assisted toward the cylinder and concave during the movement of said troughs or pans as described, and the separation of the clover before it reaches the cylinder and concave facilitated, and all seed thereby dislodged falls in the troughs or pans and eventually finds its way into the body of the machine, from which it, together with that separated from the pods through the action of the cylinder and concave or other mechanism will be carried off in the usual manner.

In connection with the feed-troughs or feed-pans 14 which initially receive and advance the clover to the cylinder, I employ what I will term upper feeding-pans 20, of which there is preferably one for each of said troughs or pans 14 and above the same. The inner ends of said upper pans are disposed a suitable distance above the inner ends of troughs or pans 14, providing the mouth 21 between the inner ends of the respective troughs 14 and pans 20 through which the clover must pass on its way to the cylinder. The pans 20 extend upwardly and outwardly and are each formed of two sections or arms, the upper arms serving as compression arms to press down the material thrown against them, and the lower arms acting as feeding arms to feed the material so compressed forward into the separator. These pans have their outer ends connected, through suitable boxings, to a crankshaft 22, the crank portions of which, like those of the crank-shaft 16, are set at opposite angles, alternately, so that as the said shaft is revolved, the pans 20 are caused to be moved up and down and in and out, coöperating with the feed-troughs or pans 14 in feeding the cylinder and preventing slugging of the cylinder, in a manner to be described; the pans 20 are preferably trough shaped and have the edges of their side walls notched or serrated as at 23.

The lower inner ends of the pans 20 are hung on rods 24 through loops or eyes 25 slidably connected with said rods and pivotally connected, as shown, with the pans. The upper outer ends of the rods 24 are connected or attached to a rock shaft 26, while the lower ends are sustained, normally in the position shown in Fig. 2 by chains 27 attached at one end to the upper casing of the feeder and their lower ends connected to a cross-bar 28, to which the rods 24 are attached. Thus it will be seen that when the pans 20 are operated the loops 25 will slide on the rods 24, and that as the feeder becomes crowded with a tendency to slug the cylinder, the inner ends of the pans 20 will rise, the connections between pans 20 and crank-shaft 22 being such as to allow for such movement, when the rods 24 will also be raised, rocking the shaft 26; upon again assuming their normal positions, the rods 24 will drop and return the rock shaft 26 to its normal position.

I will now describe the mechanism for operating both the feed-troughs or pans 14 and the upper pans 20, including the means controlled by the raising of the inner ends of the pans 20 and rocking of rock shaft 26 for regulating the feed of the clover by slowing up or stopping the movement of the troughs or pans 14 until the surplus feed is reduced, thereby preventing slugging of the cylinder.

On the near end of the cylinder shaft 10 is carried a pulley 29 which is connected by means of a belt 30, with a shaft 31 through a pulley 32. On the opposite end of the shaft 31, see Fig. 2, is carried a sprocket wheel 33 from which leads a sprocket chain 34 which connects with a sprocket wheel 35 on the crank shaft 22, and in this way impart motion to said crank shaft. On the near end of this crank shaft 22 is carried both a sprocket wheel 36 and a governor wheel 37. With the former is connected a sprocket chain 38 that passes down and around an idler pinion 39 on a short shaft 40 and up and around an idler pinion 41 on a short shaft 42, and on the shaft 42 is carried a sprocket wheel 43 which operates a sprocket chain 44 passing around the same and leading to and about a sprocket wheel on the near end of the crank shaft 16. An idler 45 adjustably supported from the sill 1, in the manner shown being employed for keeping the chain 44 sufficiently taut. Thus it will be seen that simultaneously with the operation of the cylinder shaft 10 through the connections described, the crank shafts 16 and 22 are operated for imparting motion to the feed-troughs or pans 14 and the upper pans 20 in the manner described.

On the near end of the rock-shaft 26 is carried an arm 46 having a brake-shoe 47 adapted to have engagement with the governor wheel 37; also connected with said rock-shaft 26 is an arm 48 with which is attached a spring 49, one end having connection with a thumb nut 50 and the other end connected or attached with a rod 51 connected in the manner shown with the sill 1 of the frame. Adjustment of the thumb-nut 50 will increase the force required to raise the upper pans 20 and rock the shaft 26; and for adjusting the brake-shoe 47 to regulate its engagement with the governor wheel 37, the arm 46 is provided with a threaded stem 52 passing through an ear 53 on the arm 48 and engaged by a nut 54, which, when adjusted, will move the brake-shoe closer to or farther from the governor wheel 37 and thereby regulate its engagement with said governor wheel.

The operation of the automatic governing mechanism is as follows: When an excess of material is fed into the device, the inner ends of the upper pans 20, are raised, thus raising the inner ends of the rods 24, and thereby turning the rock shaft 26, against the tension of the regulating spring 49, which acts on the rock shaft 26, through the medium of the lever arm 48. The turning of rock shaft 26, forces the brake shoe 47, against the governing wheel 37. The sprocket wheel 36 and the governing wheel 37 are formed integral and are keyed to the shaft 22, which in turn is driven from shaft 31, through sprocket 33, sprocket chain 34 and sprocket 35, it therefore follows that any extra retardation on the governor wheel 37, will be transmitted to shaft 31, hence to belt wheel 32, and to the belt 30. This extra retardation thrown on the belt 30 will cause it to slip on drive pulley 29 and hence all the mechanism driven by said belt will be either retarded or stopped.

No attempt has been made to detail the governor wheel 37 and its connections with the sprocket 36 for regulating the operation of connections between the same and the shaft 16 when the brake is set to control the feed of the clover, as any well known form of governor may be employed, and the description together with the showing here made is thought to be sufficient for those skilled in the art to understand the operation and results to be obtained.

Having thus fully described my invention, what I claim and desire to secure by Letters Patent of the United States, is:—

1. In a device of the class described, horizontally disposed feeding troughs, a crank shaft adapted to reciprocate said troughs, feeding pans disposed angularly above the feeding troughs, an upper crank shaft adapted to reciprocate said feeding pans, a contact wheel on said upper crank shaft, a rocker shaft, connections between the feeding pans and said rocker shaft adapted to rock said rocker shaft when the lower ends of the feeding pans are raised, a brake shoe on said rocker shaft adapted to contact with the contact wheel when the rocker shaft is rocked, tension means in operative connection with the rocker shaft adapted to oppose its being rocked, and means for actuating the lower crank shaft from the upper crank shaft.

2. In a device of the class described, substantially horizontal feeding troughs, a crank shaft in operative connection with said troughs and adapted to reciprocate them longitudinally, feeding pans suspended above the feeding troughs, an upper crank shaft in operative connection with said feeding pans adapted to reciprocate them longitudinally, a governor wheel on said upper crank shaft, a rocker shaft, a friction brake shoe on said rocker shaft and in operative relation to said governor wheel, depending lever members on the rocker shaft, operative connection between said lever members and the lower ends of the feeding pans, power transmission means between a source of power and the upper crank shaft, power transmission means between the upper crank shaft and the lower crank shaft, the construction and arrangement of parts being such that the friction brake shoe becomes operative upon the governor wheel when the lower ends of the feeding pans are raised.

In testimony whereof I affix my signature, in presence of two witnesses.

JOHN A. WHITE.

Witnesses:
Chas. W. La Porte,
Laura E. Claypool.

---

Copies of this patent may be obtained for five cents each, by addressing the "Commissioner of Patents, Washington, D. C."